United States Patent
Moreland

(10) Patent No.: US 7,325,796 B2
(45) Date of Patent: Feb. 5, 2008

(54) POLYMER AND RIGID SUSPENSION BEARING ASSEMBLY FOR MOTOR VEHICLES

(76) Inventor: Charles E. Moreland, 1176 martin Ave., San Jose, CA (US) 95126

( * ) Notice: Subject to any disclaimer, the term of this patent is extended or adjusted under 35 U.S.C. 154(b) by 0 days.

(21) Appl. No.: 11/001,109

(22) Filed: Nov. 30, 2004

(65) Prior Publication Data
US 2005/0116402 A1 Jun. 2, 2005

Related U.S. Application Data

(60) Provisional application No. 60/525,890, filed on Dec. 1, 2003.

(51) Int. Cl.
*F16F 1/44* (2006.01)
(52) U.S. Cl. ................................ 267/293; 384/297
(58) Field of Classification Search ................ 267/279, 267/280, 282, 292, 293; 384/297, 299, 300
See application file for complete search history.

(56) References Cited
U.S. PATENT DOCUMENTS

| | | | | |
|---|---|---|---|---|
| 3,107,951 A * | 10/1963 | Palm | ........................ | 384/153 |
| 3,642,268 A * | 2/1972 | Hipsher | ........................ | 267/281 |
| 3,888,472 A * | 6/1975 | Hofmann | ........................ | 267/279 |
| 4,840,395 A * | 6/1989 | Sturmon | ........................ | 280/86.75 |
| 5,286,014 A * | 2/1994 | Chakko | ........................ | 267/293 |
| 6,619,639 B1 * | 9/2003 | Shelley et al. | ........................ | 267/292 |

* cited by examiner

Primary Examiner—Christopher P. Schwartz

(57) ABSTRACT

A rigid bearing assembly designed to achieve a low tolerance fit to an imprecisely sized, misaligned, out-of-round or otherwise distorted suspension member. Assembly is comprised of a rigid bearing enveloped with a elastomer layer. The elastomer layer is disposed between the bearing and suspension member. Upon insertion of the assembly into the suspension member, the elastomer layer compresses slightly to absorb irregularities and broad manufacturing tolerances in the suspension member while insulating the rigid bearing from distortion. The rigid bearing provides low-friction movement of suspension members about an axis. The polymer layer is sufficiently hard to provide precise location of suspension members under load. The ability to isolate the bearing from irregularities enables lower cost of production of all components. This same ability facilies easy retrofit of the invention to suspension members originally designed for rubber bushings without need for custom fitment or specialized tools.

4 Claims, 5 Drawing Sheets

POLYMER AND RIGID SUSPENSION BEARING ASSEMBLY FOR MOTOR VEHICLES

CROSS-REFERENCE TO RELATED APPLICATIONS

Figure 1A:
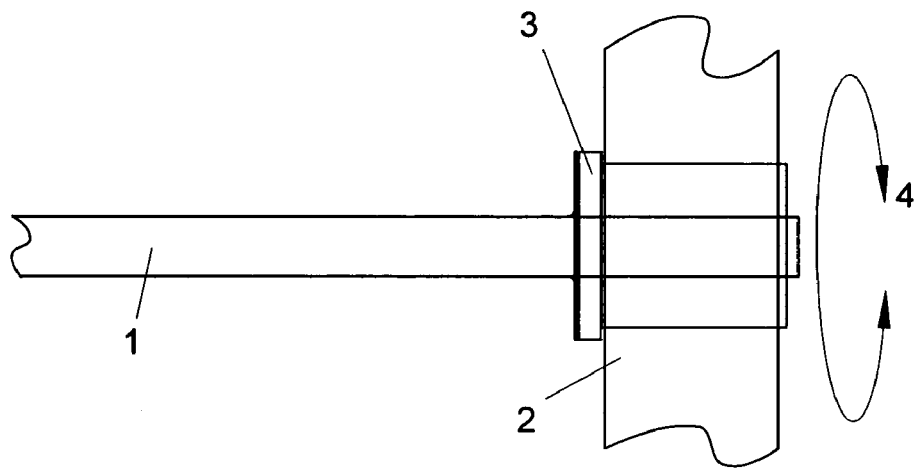

This application claims the benefit of provisional patent application Ser. No. 60/525,890, filing date Dec. 1, 2003 by the present inventor.

FEDERALLY SPONSORED RESEARCH

Not applicable

SEQUENCE LISTING OR PROGRAM

Not applicable

BACKGROUND OF THE INVENTION—FIELD OF INVENTION

The invention relates to bushings and bearings, and in particular improved fitment to motor vehicle suspension systems.

BACKGROUND OF THE INVENTION—PRIOR ART

Motor vehicle suspension systems including McPherson strut, leaf spring, multi-link, double wishbone and other types utilize joints to connect suspension members. These joints provide attachment between moveable suspension members while allowing freedom of movement along one or more axis. "Suspension member" is used to describe any component of a suspension including a chassis or other moveable member and its use is meant to be descriptive and not restrictive.

Well established in prior art, these joints commonly use bushings constructed of rubber or other elastomers to accommodate this required movement. Through deformation, rubber bushings allow angular movement and misalignment of the suspension members. See FIGS. 1A (top view) and 1B (end view) show a rubber bushing 3 used to connect a first suspension member 1 and a second suspension member 2. The rubber bushing 3 is disposed in the space between the first suspension member 1 and the second suspension member 2. The bushing allows rotation about an axis 4.

The rubber bushing 3 typically has no friction surface and is often bonded to the first suspension member 1 or second suspension member 2 or both. The rubber bushing 3 allows movement through deformation. This same deformation property allows for broad manufacturing tolerances in the bushing 3, first suspension member 1, and second suspension member 2 since the rubber can distort to conform to the first suspension member 1 and second suspension member 2. This allows broad tolerances for size, roundness, alignment, and surface irregularities creates manufacturing economies of all parts involved and is a primary reason rubber bushings are used in most commercial vehicle suspension systems.

This same deformation property creates serious problems when using rubber bushings for performance applications requiring precise location of suspension members. When under load, compression of rubber bushings causes imprecise location of suspension members, precluding use in precision and performance applications. FIG. 1C (end view) shows a rubber bushing 3 that has compressed under load allowing the first suspension member 1 to become non-concentric in the second suspension member 2 thus allowing the first suspension member 1 to become misaligned.

Polymer and plastic substitutes have been developed to replace rubber bushings in high performance suspension systems and are well known in prior art. Polymer bushings are significantly harder than rubber bushings and deform less under load providing more precise location of suspension members. Though visually similar to rubber bushings, polymer bushings accommodate motion about an axis through a friction surface. This is in contrast to rubber bushings that accommodate motion through deformation. This difference in operation is critical and creates problems with polymer bushings.

Figure 2A:
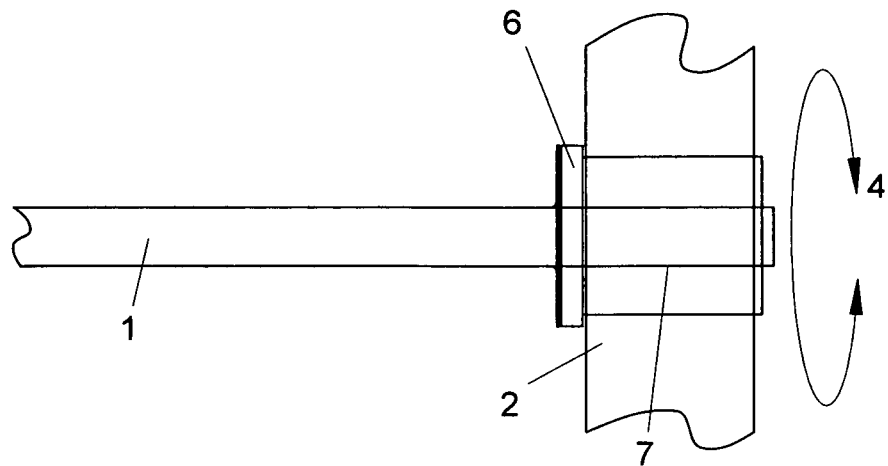
Figure 2B:
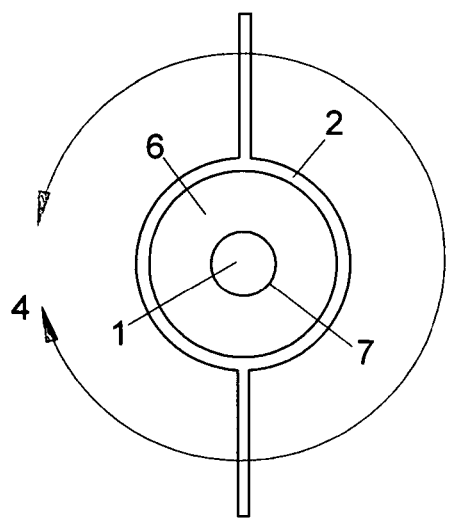

FIG. 2A (top view) and FIG. 2B (end view) show a first suspension member 1 and a second suspension member 2. The rubber bushing has been replaced with a polymer bushing 6. The polymer bushing 6 accommodates angular movement along an axis 4 using the polymer as a friction surface 7 riding over the first suspension member 1. For the polymer bushing 6 to slide freely over the first suspension member 1 and with low friction it is critical that the friction surface 7 be smooth, straight, round and with a precise fit.

Figure 2C:
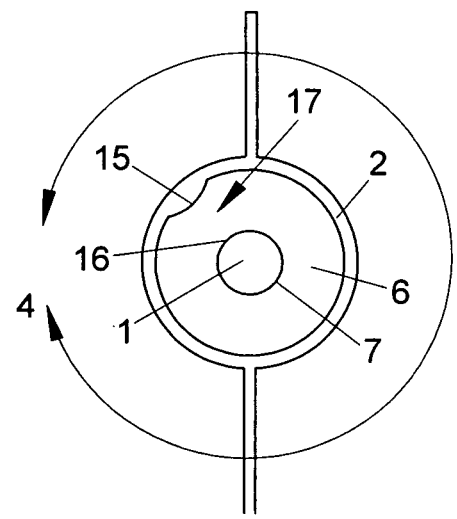

Polymer bushings are problematic when retrofit to suspension members designed for rubber bushings. The broad tolerance typical of suspension members distorts the polymer bushing and its friction surface. FIG. 2C (end view) shows a polymer bushing 6 installed in second suspension member 2 that has an irregularity 15. The polymer bushing 6 is pinched in the area 17 between the irregularity and the first suspension member 1. The pinching creates excessive tightness and friction in the friction surface 7 at the area 16.

The friction surface 7 is thus compromised in terms of diameter, surface smoothness and roundness. The result is poor fit, high friction, pinching and binding resulting in erratic motion of the suspension members. The resulting high-friction is highly undesirable in performance suspensions. To correct this problem polymer bushings require costly custom machining of the bushings or suspension members to avoid pinching and binding.

Polymer bushings are also well known to produce undesired noise when in use.

Though polymer bushings do provide more precise location of suspension members than rubber bushings, their many disadvantages including costly fitment, high friction, and noise make them an unsatisfactory rubber bushing alternative.

Metal bearings and bushings have been used in performance suspension prior art including roller bearings, spherical bearings, plain bearings and other types. Metal bearings can provide precise location and low friction movement of suspension components.

Metal bearings require precise fitment with tolerance in the range of 0.0005 inches. Achieving suitable fit is very difficult to suspension components built to the broad manufacturing tolerances typical in commercial vehicles with tolerances in the range of 0.020 inches or more. Suspension components that are slightly out-of-round, undersized, oversized, misaligned or otherwise irregular create fitment problems. Loose fitment can create unacceptable movement and wear of the bearing. Tight fitment can make assembly difficult or impossible and can distort the bearing causing increased friction, binding and accelerated wear.

BACKGROUND OF THE INVENTION—OBJECTS AND ADVANTAGES

Accordingly, several objects and advantages of my invention are as follows:

(a) To provide precise location of suspension components.

(b) To provide free angular rotation of suspension components about an axis without binding or excessive friction.

(c) To enable fitment to suspension components manufactured to imprecise tolerances facilitating easy retrofit and low cost of manufacture.

(d) To enable retrofit to suspension components without a need for custom machining of the invention of suspension components (e) To enable retrofit to suspension components without a need for specialized tools.

Further objects and advantages of my invention will become apparent from a consideration from the drawings and ensuing description.

SUMMARY

The present invention combines a rigid metallic bearing with a polymer layer. The bearing provides low-friction movement of suspension components about one or more axis and precise location of suspension components under load. The polymer layer is disposed between the bearing and suspension components. It compresses to absorb irregularities and broad manufacturing tolerances in suspension components without distortion of the bearing. The ability to absorb irregularities enables low precision manufacturing and its attendant lower cost of production and without need for custom fitment. This same ability facilities easy retrofit of the invention to suspension members originally designed for rubber bushings.

DRAWINGS—FIGURES

Figure 1B:
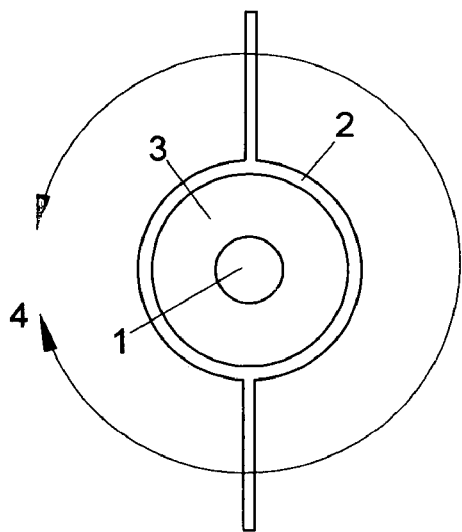
Figure 1C:
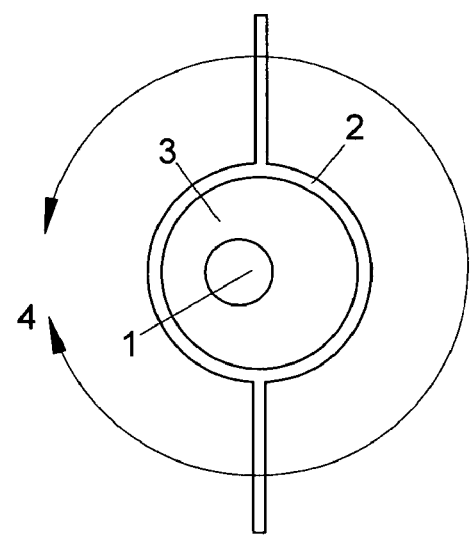
Figure 3A:
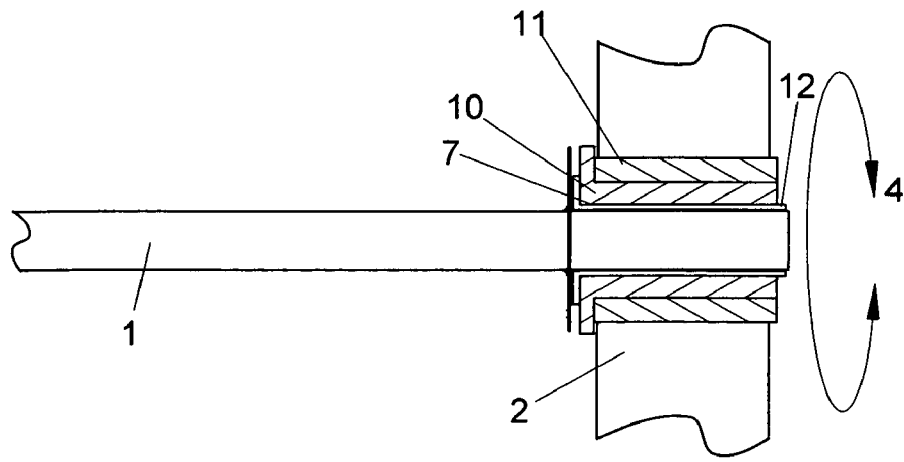
Figure 3B:
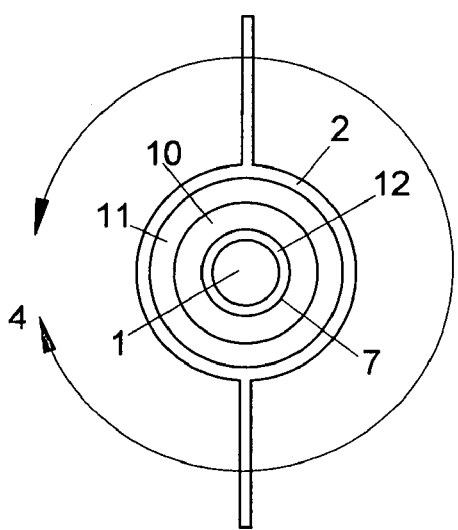
Figure 3C:
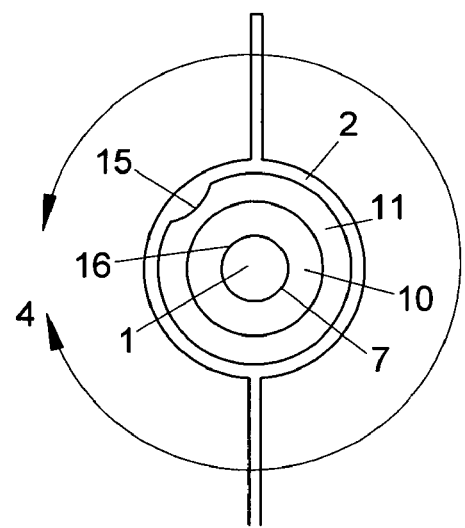

FIGS. 1A and 1B illustrate a typical rubber bushing connecting a first suspension member and second suspension member FIG. 1C illustrate a typical rubber bushing that has compressed under load connecting a first suspension member and second suspension member FIGS. 2A and 2B illustrates a typical polymer bushing connecting a first suspension member and second suspension member FIG. 2C illustrates the affect of second suspension member irregularities on polymer bushings FIGS. 3A and 3B illustrates a polymer and rigid metal bearing assembly connecting a first suspension member and second suspension member FIG. 3C illustrates the affect of second suspension member irregularities on polymer and rigid suspension bearing assembly.

Figure 4A:
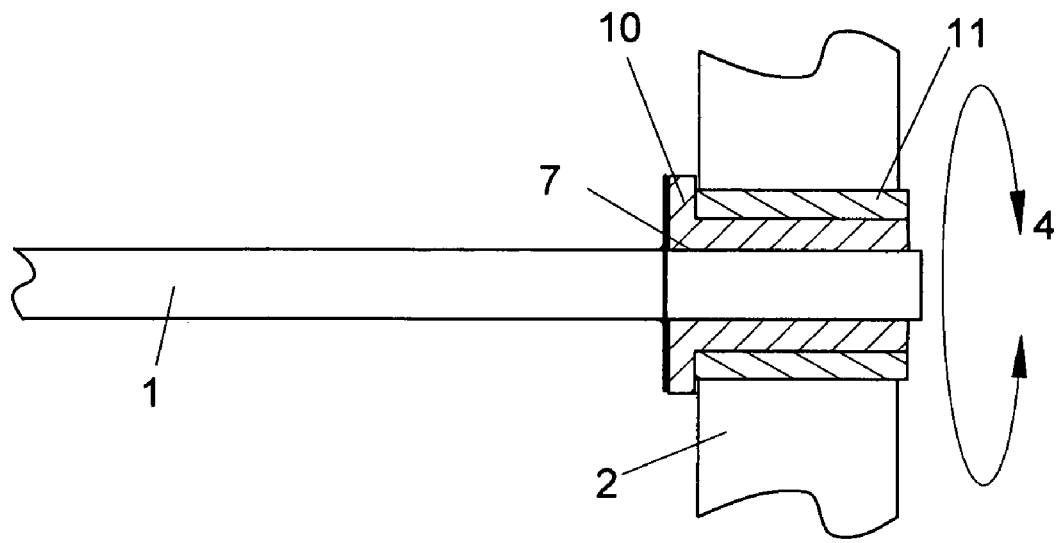
Figure 4B:
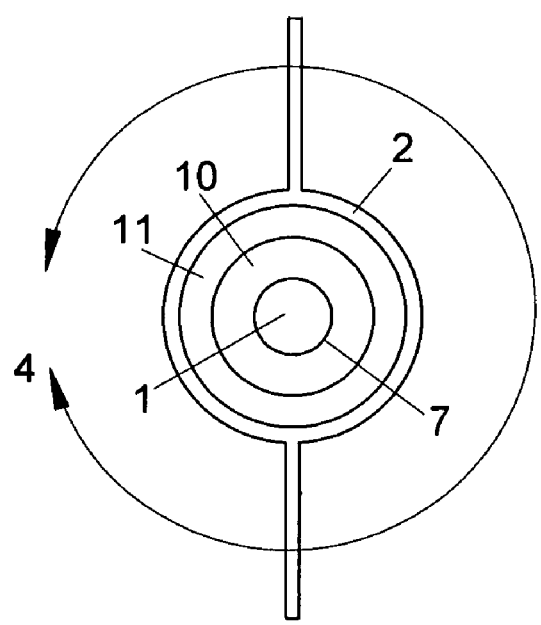
Figure 5A:
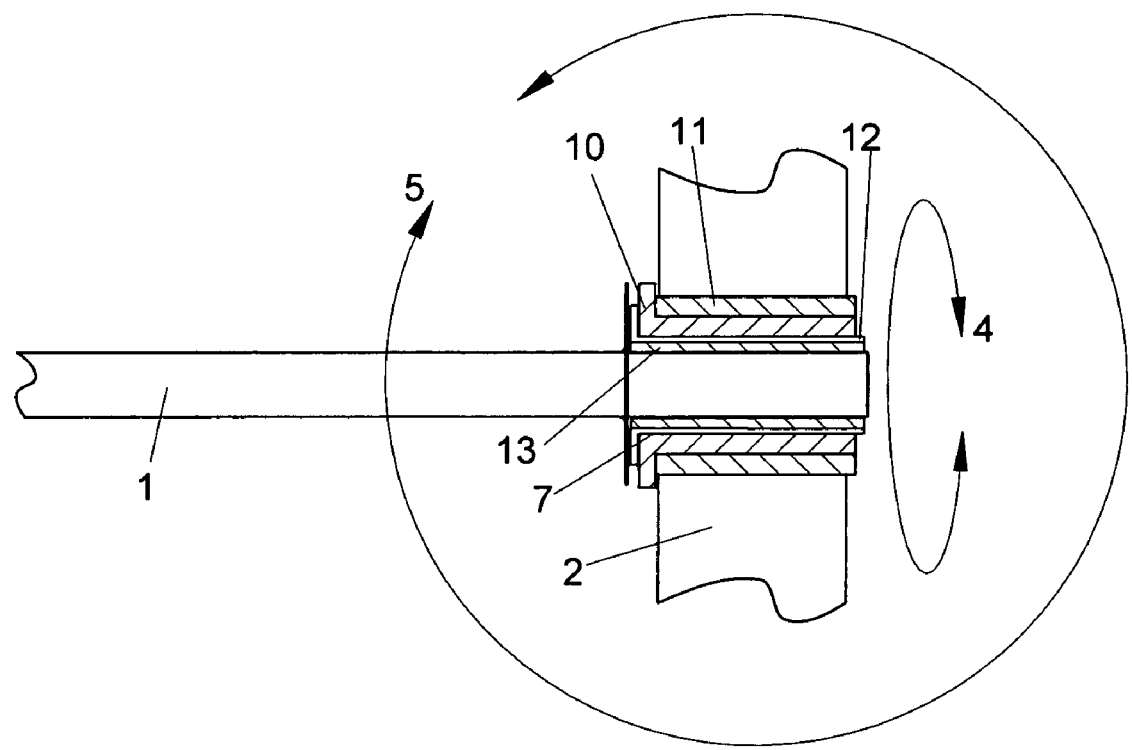
Figure 5B:
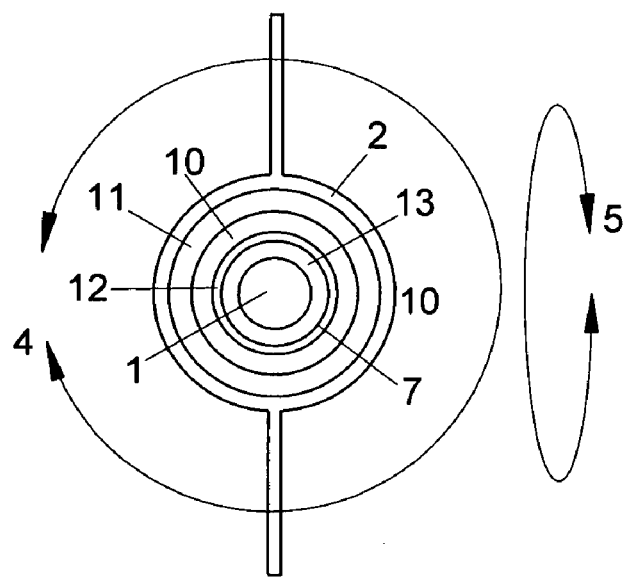

FIGS. 4A and 4B illustrates an alternative embodiment of a polymer and rigid metal bearing assembly connecting a first suspension member and second suspension member FIGS. 5A and 5B illustrates yet another alternative embodiment of a polymer and rigid metal bearing assembly connecting a first suspension member and second suspension member

DRAWINGS—REFERENCE NUMERAL

1—first suspension member
2—second suspension member
3—rubber bushing
4—axis of rotation
6—polymer bushing
7—friction surface
10—rigid bearing
11—polymer layer
12—race
13—second polymer layer
15—suspension member irregularity
16—friction surface beneath suspension member irregularity
17—portion of polymer bushing compressed beneath member irregularity

DETAILED DESCRIPTION AND PREFERRED EMBODIMENT

A preferred embodiment is shown in FIG. 3A (top view) and FIG. 3B (end view). The invention includes a rigid bearing 10 and a race 12 that are mated at the friction surface 7. The rigid bearing 10 is fit inside a second suspension member 2 and a polymer layer 11 is disposed in the space between the rigid bearing 10 and the second suspension member 2. The race 12 is fit around a first suspension member 1.

The rigid bearing 10 and race 12 are of any conventional design and may be selected from the group comprising a ball, needle or other roller-type bearing or plain-type bearing including bronze, slipper, spherical and/or combinations thereof powdered metal, steel, rigid plastic or other rigid material bearings or bushings known to the prior art. The rigid bearing 10 is preferentially a bronze plain bearing (slip bearing) which will serve the purpose of illustration.

The race 12 is preferentially steel but may be aluminum, stainless, or other metal or plastic. The race 12 may be a separate part that is secured to the first suspension member 1 using an interference-fit, adhesive, mechanical fastener, weld or other means.

The polymer layer 11 is preferentially polyurethane with a durometer of approximately 60A to 100A but may be made of other polymers or elastomers.

The polymer layer 11 is preferentially cast in a mold with the rigid bearing 10 forming the inside of the mold. The outside of the mold approximates the shape of the second suspension member 2 and is sized such that the completed part fits tightly in the second suspension member 2.

The polymer layer 11 may alternatively be machined from standard stock, cast in a standalone mold, or employ other molding processes.

The polymer layer 11 is preferentially bonded or affixed to the bearing 10 or second suspension member 2 or both using adhesive.

The rigid bearing 10 and race 12 are generally cylindrical and collinear with an axis 4.

The rigid bearing 10 and race 12 may have flanges or alternative means to support thrust loads.

OPERATION OF THE INVENTION

The invention includes a rigid bearing of conventional design that secures a first suspension member to a second suspension member and operates in a manner identical to bearings in present use. FIG. 3A (top view) and FIG. 3B (end view) illustrate a preferred embodiment with a bronze rigid bearing 10 that and a race 12 mated upon the friction surface 7. The race 12 is fit to a first suspension member 1. The rigid bearing 10 is fit within a second suspension member 2. The rigid bearing 10 and race 12 provide free angular motion of the first suspension member 1 within the second suspension member 2 with low friction about the axis 4.

In the preferred embodiment the polymer layer 11 is affixed to the rigid bearing 10. For installation, this assembly is pressed into the second suspension member 2. The polymer layer 11 remains in the space between the rigid bearing 10 and the second suspension member 2. With a durometer in the range of 60A to 100A, the polymer layer 11 is slightly compressible or deformable. It provides an interference-fit with the second suspension member 2 and compresses to absorb manufacturing tolerances in the second suspension member 2.

This ability of the polymer layer 11 to slightly deform enables the rigid bearing 10 that requires precise fitment tolerances in the range of 0.0005 inches to be fit to the second suspension member 2 with very broad manufacturing tolerances in the range of 0.020 inches. This enables manufacturing economies of all parts involved and enables retrofit of the invention to suspension members originally designed for rubber or other bushing materials. The rigid bearing 10 is thus not deformed by the second suspension member 2 and continues to move freely.

FIG. 3C (end view) illustrates an example of the invention installed in a second suspension member 2 that has an exaggerated manufacturing irregularity 15. The polymer layer 11 deforms to accommodate the irregularity 15. However, the rigid bearing 10 has not been distorted. The friction surface 7 is not compromised and the bearing continues to operate freely.

This is a major advantage over the prior art FIG. 2C (end view) showing the polymer bushing 6 compressed by a suspension member irregularity 15. Lacking a rigid core, the compressed polyurethane bushing 6 has pinched the friction surface 7 at the location 16. The result is high friction and erratic movement of the suspension members.

Only slightly compressible, the polymer layer 11 is substantially harder than typical rubber bushings and provides precise positioning of the suspension members under load. The invention provides the precise positioning that rubber bushings fail to provide.

DESCRIPTION AND OPERATION OF ALTERNATIVE EMBODIMENTS

Key to the invention is the combination of a rigid bearing or bushing with a polymer layer. The rigid bearing may be of many designs including roller, ball, spherical, powdered metal, bronze, rigid plastic and others. Additional housings may be utilized between the bearing and the polymer layer to adapt the bearing to a convenient shape.

FIG. 4A (top view) and FIG. 4B (end view) show an alternative embodiment that is included as an example of the many alternative rigid bearing implementations and not as a limitation. This example does not include a separate race. In this example the rigid bearing 10 is mated directly to the surface of the first suspension member 1 with a friction surface 7. The operation of the invention is otherwise the same.

Yet another alternative embodiment includes a second polymer layer. FIG. 5A (top view) and FIG. 5B (end view) show a second polymer layer 13 disposed in the space between the race 12 and the first suspension member 1. In this implementation the second polymer layer 13 deforms to accommodate manufacturing irregularities in the first suspension member 1. This enables the race 12 with precise fitment requirements in the range of 0.0005 inches to be fit to a first suspension member 1 with broader manufacturing tolerance in the range of 0.020 inches. The operation of the invention is otherwise the same.

ADVANTAGES

From the description above, a number of advantages of my polymer and rigid suspension bearing become evident:
(a) The invention provides precise positioning of suspension components under load that is significantly better than conventional rubber bushings
(b) The invention provides free angular movement of a suspension members without binding or excessive friction
(c) The invention allows easy retrofit to suspension members originally designed for rubber bushings
(d) The invention accommodates large manufacturing tolerances and irregularities in the suspension members, facilitating manufacturing economies
(e) The invention requires no special machining or specialized tools to install

CONCLUSION, RAMIFICATIONS AND SCOPE

Thus the reader will see that the invention provides precise positioning of suspension components that is superior to rubber bushings. The invention can be easily retrofit to suspension members with broad tolerances that were designed for rubber bushings yet still provide non-binding, low-friction movement of the suspension members. Further, that the invention can be readily installed without specialized tools or custom machining.

Although the description above contains many specificities, these should not be construed as limiting the scope of the invention but as merely providing illustrations of some of the presently preferred embodiments of invention. For example the polymer layer could be inside the rigid bearing.

Thus the scope of the invention should be determined by the appended claims and there legal equivalents, rather than by the examples given.

I claim:

1. A bearing assembly for rotatably attaching a first suspension member to a second suspension member, said bearing assembly allowing low-friction rotation of said second suspension member about said first suspension member, said bearing assembly providing a means to maintain low-friction rotation while accommodating imprecisely sized, misaligned, out-of-round or otherwise distorted said second suspension member, said bearing assembly comprised of:

an inner rigid bearing means
for providing a means of rotation about one or more axes
said inner rigid bearing means with an inside surface attachable to said first suspension member and an outside surface isolated from said second suspension member by an elastomer layer
said elastomer layer sandwiched between said inner rigid bearing means and said second suspension member
said elastomer layer fixed in position relative to said inner rigid bearing means and said second suspension member whereby said elastomer layer may deform to accommodate irregularities and distortion in said second suspension member while isolating said inner rigid bearing means from such irregularities and allowing the friction surface of said inner rigid bearing means to remain undistorted, precise, true and low-friction.

2. The bearing assembly of claim 1 with said elastomer layer of hardness of approximately 60A to 100A.

3. The bearing assembly of claim 2 with a polymer used for said elastomer layer.

4. The bearing assembly of claim 1 wherein said inner rigid bearing means for providing said means of rotation has an inner surface that is isolated from said first suspension member by an elastomer layer.

* * * * *